United States Patent
Flamm et al.

[11] Patent Number: 5,988,846
[45] Date of Patent: Nov. 23, 1999

[54] METHOD OF OPERATING A DRIVE SYSTEM AND DEVICE FOR CARRYING OUT THE METHOD

[75] Inventors: Heinz Flamm, Villmergen; Franz Furrer, Fislisbach; Reinhold Güth, Oberrohrdorf, all of Switzerland

[73] Assignee: Asea Brown Boveri AG, Baden, Switzerland

[21] Appl. No.: 08/869,891

[22] Filed: Jun. 5, 1997

[30] Foreign Application Priority Data

Jul. 1, 1996 [DE] Germany .................. 196 26 287

[51] Int. Cl.$^6$ ................................ G05B 11/01
[52] U.S. Cl. .............. 364/137; 364/131; 364/132; 364/133; 364/138; 364/469.01
[58] Field of Search .................. 364/132, 131, 364/133, 137, 138, 139, 176, 468.24, 174, 469.01, 469.03; 318/85, 625, 5, 7, 8, 632; 395/551–560; 340/825.14

[56] References Cited

U.S. PATENT DOCUMENTS

| | | | |
|---|---|---|---|
| 4,093,904 | 6/1978 | Burig et al. ............... | 364/174 X |
| 4,408,281 | 10/1983 | Tack, Jr. et al. ........... | 318/85 X |
| 4,815,013 | 3/1989 | Schmidt ..................... | 364/189 X |
| 4,949,390 | 8/1990 | Iverson et al. ............. | 382/258 |
| 5,130,987 | 7/1992 | Flammer ..................... | 370/436 |
| 5,170,708 | 12/1992 | Dilalla ...................... | 364/469.03 X |
| 5,175,680 | 12/1992 | Yoneda et al. .............. | 364/176 |
| 5,361,363 | 11/1994 | Wells et al. ................ | 395/800 |
| 5,530,323 | 6/1996 | Breitzmann .................. | 318/85 |
| 5,642,366 | 6/1997 | Lee et al. .................. | 714/762 |
| 5,751,721 | 5/1998 | Bloks ........................ | 370/509 |
| 5,768,283 | 6/1998 | Chaney ....................... | 714/700 |
| 5,777,870 | 7/1998 | Takaku et al. .............. | 364/132 |
| 5,872,799 | 2/1999 | Lee et al. .................. | 714/755 |

FOREIGN PATENT DOCUMENTS

| | | |
|---|---|---|
| 0071352 | 2/1983 | European Pat. Off. . |
| 0155472A1 | 9/1985 | European Pat. Off. . |
| 3928451A1 | 3/1991 | Germany . |
| 4214394A1 | 11/1993 | Germany . |
| 4215227A1 | 11/1993 | Germany . |
| 4407571A1 | 9/1995 | Germany . |

OTHER PUBLICATIONS

"Antriebstechnik im Verbund", Antriebsregelungen und –steuerungen, No. 1/2, Jan. 1989.

"Langswellenloser Zeitungsdruck", Bosse, Zeitungsbruck, Feb. 1995.

"Antriebstechnik im Verbund", Technische Rundschau 28/91, Jul. 1991.

"Printa –wellenloses Antriebssystem –" Kankainen, ifra Seminar, May 1996.

"SERCOS interface" product literature, Oct. 1995.

"SERCOS interface" technical manual, Sep. 1991.

*Primary Examiner*—William Grant
*Assistant Examiner*—McDieunel Marc
*Attorney, Agent, or Firm*—Burns, Doane, Swecker & Mathis, L.L.P.

[57] ABSTRACT

A drive system and a method of operating such a system are specified. The drive system comprises at least two drive groups having a plurality of drive controllers of controlled drives. The drive controllers of a drive group are synchronized via a drive bus by means of a local synchronization clock, and the local synchronization clocks are made equal to a global synchronization clock via a drive data network connecting the drive control means. The plant-wide synchronization of the drives via a global signal enables a drive system to be equipped with a virtually arbitrary number of drives. As a result of the fact that the desired values are preferably likewise transmitted synchronously, based on the global synchronization clock, between the drive control means via the drive data network, it is also the case that no time errors occur during the desired value transmission. The invention is preferably used for rotary printing machines.

32 Claims, 4 Drawing Sheets

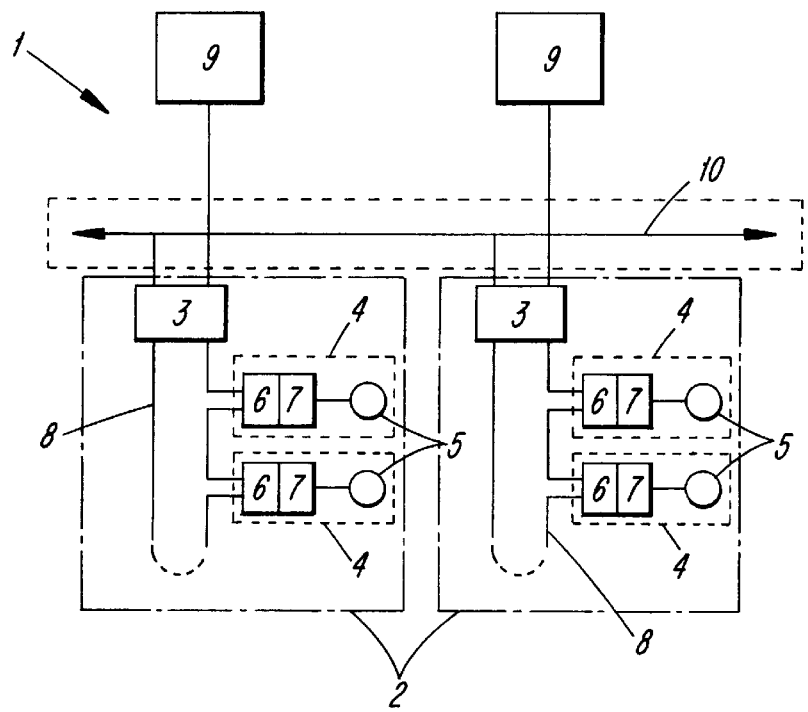
Fig. 1
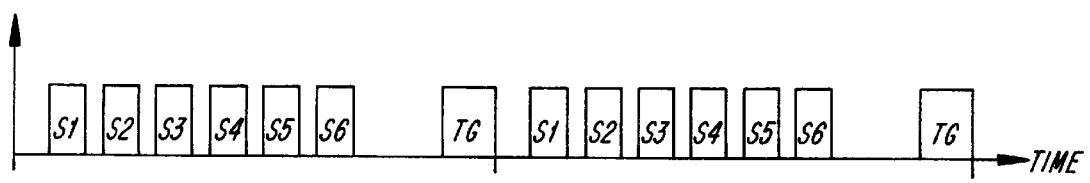
Fig. 2(a)
Fig. 2(b1)
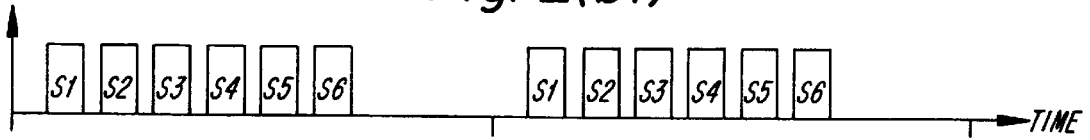
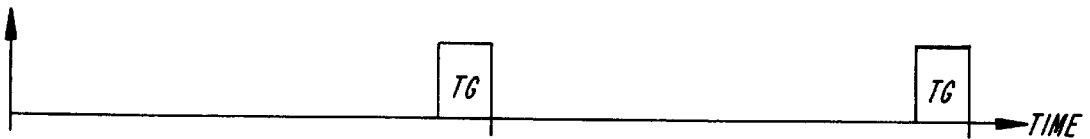
Fig. 2(b2)

METHOD OF OPERATING A DRIVE SYSTEM AND DEVICE FOR CARRYING OUT THE METHOD

BACKGROUND OF THE INVENTION

1. Field of the Invention

The invention relates to electric drive technology. It is based on a method of operating a drive system. Furthermore, the invention relates to a device for carrying out the method.

The fields of application of the invention are, for example, machine tools and rotary printing machines. A preferred application is rotary printing machines for printing newspapers, having a large number of individually driven printing cylinders and having flexible production capabilities.

2. Discussion of Background

A method and a device of the generic type is known from the text of the paper presented at the "Ifra" seminar, May 21 and 22, 1996, by Juha Kankainen, Honeywell Oy, Varkaus, Finland. Presented there is a shaftless drive system in which a plurality of drive groups are provided, each drive group comprising a drive control means and at least one drive. For its part, the drive comprises a drive controller and at least one motor. The drive controllers are connected to one another via a drive bus (in the document mentioned, designated "vertical SERCOS ring"). The drive control means (designated "process station") are connected via a dedicated drive data network in the form of a ring. The drive control means are connected to higher-order control units. According to the SERCOS standard, the drives are synchronized via a local synchronization clock.

A further concept for a shaftless drive system in the form of a rotary printing machine is disclosed by German Laid-Open Specification DE 42 14 394 A1. The rotary printing machine disclosed in this document constitutes a drive system which comprises at least two drive groups in the form of individually driven printing point groups. The drive groups have a drive control means and at least one drive, which is composed of a motor and a drive controller. The drive groups receive their position reference (master shaft) directly from the folding apparatus. The drive controllers of the drive groups are likewise connected via a drive bus. The drive control means are connected to one another via a data bus and to an operating and data processing unit. The predefinition of desired values and the administration of the printing point groups is carried out via this data bus.

The drive controllers of such a drive system enable torque control, speed control (rotational speed control) or position control (angular position control) of the driven shaft. In the case of high requirements for angular synchronism, such as there are, for example, in drive systems in machine tools and in printing machines, position controllers (angular position controllers) are preferably used.

The digital drive controllers are preferably equipped with fast digital signal processors. Such fast digital drive controllers can execute one control cycle, in the case of position control, in a very short computing time, preferably in 250 $\mu$s or in a shorter cycle time.

In such drive systems, three-phase motors are preferably used. The electric drive power is supplied to the individual motor via a power electronic circuit, preferably having a frequency converter function. The power electronic circuit is driven by the digital drive controller.

The individual drives are equipped with highly accurate actual value transmitters, preferably optoelectronic position transmitters. The signal resolutions of such known, highly accurate actual value transmitters lie in the range of over 1,000,000 points per revolution (360°). The practically useful measurement accuracies of the known actual value transmitters lie in the range of more than 100,000 points per revolution (360°).

The actual value transmitter for the individual drive is often fitted to the motor shaft. However, arrangements are also known in which an actual value transmitter is fitted to the load driven by the motor. For example, in the case of printing machines it is advantageous to fit a high-resolution position transmitter at the torque-free end of the driven printing cylinder.

The decisive factor for high-precision synchronism of a plurality of position-controlled individual drives is the accurate synchronization of the drives via a common clock, and the cyclic supply thereto of position desired values in the predefined clock frame.

The common clock ensures that the individual drive controllers execute their position control functions exactly synchronously in time (at the same time) and in so doing evaluate the predefined position desired values in a time-consistent manner (at the same time).

Drive systems are known in which a number of individual drives are supplied with a common synchronization clock and with desired value data from a central drive control means via a fast drive bus.

The data transfer is preferably carried out according to the stipulations of the SERCOS standard. The SERCOS standard is a data interface agreed by several drive manufacturers, which supports the synchronization and the desired value transmission for the drives of a drive group.

With reference to the SERCOS standard, see: "Kurzübersicht der Produkte mit SERCOS-Interface" [Brief overview of products with a SERCOS interface], 2nd edition, October 1995, Fördergemeinschaft SERCOS interface e.V., Im Mühlefeld 28, D-53123 Bonn; or "SERCOS interface, Digitale Schnittstelle zur Kommunikation zwischen Steuerungen und Antrieben in numerisch gesteuerten Maschinen" [SERCOS interface, digital interface for communication between control means and drives in numerically controlled machines], Update 9/91, Fördergemeinschaft SERCOS interface e.V., Pelzstrasse 5, D-5305 Alfter/Bonn.

In this case, the drive bus is preferably implemented as a ring-like glass fiber connection. The data transmission is in this case controlled and coordinated by a central main station (bus master). The individual drives, connected to the ring-like data line, are substations, that is to say slaves, in the data transmission. The individual drives receive a common synchronization clock and their desired value data from the central drive control means via the drive bus. The central drive control means generates the common synchronization clock and calculates the desired values for the individual drives of the drive group. The drive control means in this case supplies, in short cycle times, in each case new desired values for the individual drive controllers. Preferred cycle times for the transmission of the common synchronization clock and for the calculation and the transmission of the desired values of the individual drives of a drive group are 62 $\mu$s, 125 $\mu$s, 250 $\mu$s, 500 $\mu$s, 1 ms, 2 ms, 3 ms, . . . 63 ms, 64 ms or 65 ms in the SERCOS standard.

Using drive systems of this type, quite high synchronization accuracies can be implemented between the drives of a drive group. Mechanical synchronization shafts and mechanical gear transmissions can be replaced by electronically synchronized groups of individual drives. Drive systems of this type, with electronic synchronization of the individual drives, thus enable electronic synchronization shafts and electronic gear transmission functions.

Using drive systems of this type; it is possible, for example, for rotary printing machines with individually driven printing cylinders to be implemented—without mechanical synchronization shafts (see, for example, the Laid-Open Specification mentioned at the beginning and the text of the paper).

Rotary printing machines for multicolor printing, having individually driven printing cylinders, place particularly high requirements on the angular synchronism of the individual drives. In the case of four-color printing, synchronization accuracies of the individual printing cylinders of the order of magnitude of 10 $\mu$m are often required. In the case of a printing cylinder periphery of, for example, 1 m this means that a position measurement and position control with an accuracy of better than 100,000 points per cylinder revolution (360°) must be carried out. In the case of printing speeds (paper web speeds) of more than 10 m/s, this moreover means that the time synchronization error between the individual drives of the cylinders printing on one paper web (according to the formula time=distance/speed=10 $\mu$m/10 m/s=1 $\mu$s) must be smaller than 1 $\mu$s.

This means that the individual drive controllers, during their position control, have to be synchronized via the drive bus with a time accuracy of better than 1 $\mu$s.

Using the drive systems cited and the synchronization and the supply of desired values to the individual drives via a ring-like glass fiber connection, according to the SERCOS interface agreements, these requirements can be achieved only for drive groups having a limited number of individual drives.

As a result of the central common devices, drive control means and drive bus, there are specific bottlenecks and disadvantages, however, which have an increasingly negative effect with an increasing number of drives in the drive group. The most important limitations and disadvantages are the following:

With an increasing number of drives, as a rule the synchronization error of the data line increases. In the case of a ring-like glass fiber connection with data transmission functions, for example in accordance with the SERCOS interface agreements, the following is true for the growth of the synchronization error: In the case of each drive controller which is connected to the glass fiber ring, a time-discrete signal sampling is carried out at a specific sampling period, for example 30 ns. The binary signal reproduced in the receiver as a result of time-discrete sampling can thus jitter at most by the sampling period, for example 30 ns (on the time axis, with respect to the original signal in the transmitter). Thus, in each participant, that is to say drive, there is a time-sampling error which makes itself noticeable as jitter (time jitter) This sampling error (jitter) also refers to the common synchronization clock. The sampling error therefore manifests itself as a synchronization error. The sampled signal is used in the individual drive and—following appropriate regeneration of the signal—is also forwarded to the respective next drive controller in the glass fiber ring. Depending on the number of drives in the glass fiber ring, the synchronization errors (jitter) of the individual participants add up to an overall error. As an example, in the case of 33 drives in the glass fiber ring, each having a 30 ns sampling error, this results in an overall synchronization error of about 1 $\mu$s.

With an increasing number of drives in the ring, the cycle time needed for the data transmission also increases. If, for example, a data transmission time of 250 $\mu$s is needed per drive, then in the case of the connection of 32 drives to a ring, this means that the cycle time for the data transmission must be at least 8 ms. A rise in the cycle time for the transmission cycles also means longer time intervals between the individual synchronization clocks—in the example cited this is 8 ms. Between successive synchronization clocks of the ring, the local clock generators of the individual drives run freely—and wander (drift) more or less from one another, depending on the inaccuracy of the crystals used.

If the local clock generator of a drive is, for example, equipped with a crystal of a quality of 100 ppm (parts per million), then this clock generator may have a time deviation of (plus or minus) 0.8 $\mu$s after 8 ms, because of its inaccuracy. The time deviation between two arbitrary drives, which is caused by the inaccuracy of the two local clock generators, is the sum of the inaccuracies of the two clock generators, for example (2*0.8 $\mu$s)=1.6 $\mu$s.

The wandering off (drifting) of the local clock generators of the individual drives between 2 successive synchronization clocks of the ring manifests itself as an additional synchronization error, since the individual drive controllers execute several control cycles during one data transmission cycle, of for example 8 ms.

In the case of a control cycle in the drive of, for example, 250 $\mu$s and a data transmission cycle of, for example, 8 ms on the ring, the drive executes 32 control processes during one data transmission cycle. Only the first control process is in this case strictly synchronized with the synchronization clock of the ring. In the case of the following 31 interpolating control processes, the time control is carried out via the local clock generator of the drive. The inaccuracy of the local clock generators of the individual drives manifests itself as additional synchronization errors in the interpolating control processes.

With an increasing number of drives in the ring, the cycle time of the data transmission therefore increases, and hence the time interval of successive synchronization clocks, and with an increasing time interval between successive synchronization clocks, the wandering apart (drifting) of the local clock generators (crystals) of the individual—drives increases. Hence the synchronization error increases and the precision of the position control no longer achieves the required values.

The drive controllers connected to a fast drive bus obtain not only the common synchronization clock, but also the desired value data from the central drive control means, which is also the master during the data transmission. With an increasing number of drives, the time needed for the desired value calculations and desired value transmissions increases. With an increasing number of drives, the loading of the central drive control means increases as a result of the cyclic desired value calculations. The central drive means supplies the connected drives cyclically with new individual desired values and with a common synchronization clock. The cycle times for the desired value calculations and the common synchronization clock are preferably of the order of magnitude of 1 ms.

With an increasing number of connected drives, the time expenditure for the desired value calculations in the central drive control means increases. For example, given a computing time of 250 $\mu$s for the desired values of one drive, and given 32 connected drives, the cycle time of the desired value calculations in the drive control means must be at least 8 ms. This constitutes an enormous computing load on the central drive control means which, for its part, once more limits the number of connected drives.

With an increasing number of drives, the effects of an individual error in the central drive control means or in the drive bus increase.

The ring-like glass fiber connection according to the SERCOS standard is not redundantly designed, and the drive control means, which is simultaneously the master in the data transmission, is also not redundantly designed. In the case of an error in the central drive control means, or in the case of an error in the drive bus, all the connected drives thus fail.

In industrial production plants it is often required to limit the effects of individual errors to a closely limited environment. An individual error in the electronics may lead to the failure of a specific functional unit but in no way to the failure of an entire production plant.

In printing machine construction, it is for example largely tolerated that an individual error in the drive electronics leads to the failure of one functional unit, for example of one printing unit having 8 printing cylinders. It is not tolerable for an error in the drive control means or in the drive bus to lead to the failure of an entire production plant, for example of an entire newspaper printing plant.

The number of drives to be connected to a drive control means and a drive bus should therefore preferably be limited to a specific number on availability grounds, so that failure of the drive bus or of the drive control means has effects only on one individual functional unit of an industrial plant, for example on one printing unit of a newspaper printing plant.

A centralized drive system having a central drive control means and a drive bus, to which all the drives to be operated in precise synchronism are connected, often does not correspond to the natural structure, functional distribution and module formation in large technical plants.

Industrial plants often comprise several self-contained functional units, which in each case contain all the associated mechanical and electrical functions.

Control systems and drive systems are therefore preferably structured, associated and distributed in accordance with the functional units of the industrial plant. This results in self-contained functional units which can be tested and commissioned simply and independently of one another. The interfaces between functional units which are delimited in this way are simple and comprehensible.

The advantages of a decentralized, distributed structure—capable of being adapted to the technical plant—of the control and of the drive system result in particular from the clearer system structure, simpler comprehensibility, better testability, closely delimited error effects. These advantages often lead to lower production costs, operating costs and maintenance costs.

In the case of newspaper printing presses, for example, the printing units, folding apparatus and reel carriers are preferably designed as self-contained functional units and are in each case equipped with dedicated, local control means and dedicated, local drive systems.

A centralized drive system having a central drive control means is a great obstacle to the implementation of technical plants having self-contained functional units and simple, clear interfaces.

The significant disadvantage of a central drive control means is that all the desired value data has to be led to the individual drives via the central drive control means. It is not possible for the local control means of a functional unit to communicate directly with the local drive control means of the functional unit, since there are no decentralized, local drive control means of functional units.

SUMMARY OF THE INVENTION

Accordingly, one object of the invention is to provide a novel method of operating a drive system by means of which no restrictions in relation to the number of drives or drive groups have to be tolerated. In addition, the high accuracy requirements, demanded in particular of a rotary printing machine, are to be able to be satisfied and flexible functional units are to be able to be formed from the drive groups and drives.

In the case of a method of operating a drive system of the type mentioned at the beginning, this object is achieved by the features of the first claim.

The core of the invention is that the drive controllers of a drive group are synchronized via the drive bus by means of a local synchronization clock, and that the local synchronization clocks are periodically made equal to a global synchronization clock via a drive data network connecting the drive control means. The plant-wide synchronization of the drives via a global signal enables a drive system to be equipped with a virtually arbitrary number of drives.

As a result of the fact that the desired values are preferably likewise transmitted synchronously, based on the global synchronization clock, between the drive control means via the drive data network, it is also the case that no time errors occur during the desired value transmission. The desired value calculation becomes very simple, in particular the calculation of the position desired values of the drives, if this is carried out in the drive control means on the basis of a position desired value of a virtual master shaft. The position desired value of the virtual master shaft is transmitted via the drive data network, and the drive control means calculate therefrom the position desired values of the associated drives.

Particularly high availability of the construction of the drive system is achieved by each drive control means being equipped for forming the global synchronization clock and it being determined, by means of a priority list, which drive control means may predefine the global synchronization clock. In addition, this priority list can be run through cyclically, so that the global synchronization clock is generated successively for a specific time interval by all the drive control means.

In order to avoid drifting apart in time of the individual drive control means, because of the inaccuracies of the local clock generators during the data transmission cycles, it is in any case appropriate to subdivide the global synchronization clock by means of additional secondary clocks.

The desired values are advantageously transmitted in a time window assigned to the corresponding drive control means.

In order to carry out the method according to the invention, the drive control means are equipped with a synchronization clock generator for the global synchronization clock. In addition, the drive data network can comprise a first and a second partial network, the global synchronization clock being transmitted via the first partial network and the desired values being transmitted via the second partial network.

For the construction of the drive data network, there are the options of a ring-like structure or a bus structure. In addition, a synchronization clock generator can be provided, from which data lines lead in star fashion to the drive control means.

The advantage of the invention resides in the fact that, as a result of the comprehensive synchronization of the local synchronization clocks of the drive groups by means of a global synchronization clock and a synchronous desired value data transmission, extremely precise synchronism of the drive groups is achieved.

A further advantage resides in the high availability and flexibility of the decentralized structure.

The method according to the invention and, respectively, the device according to the invention are preferably employed for rotary printing machines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a block diagram of a drive system according to the invention;

FIGS 2a–b2 show various types of transmission of the synchronization clock and of the desired value data;

Figure 3:
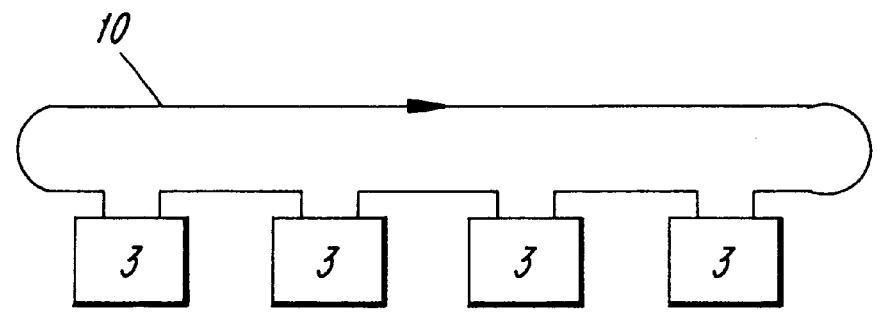
FIGS. 3–9 show various topologies of the drive network.

The reference numerals used in the drawings and their significance are listed in summary in the list of designation numerals.

LIST OF DESIGNATIONS

1 Drive system
2 Drive group
3 Drive control means
4 Drive
5 Motor
6 Drive controller
7 Power electronic circuit
8 Drive bus
9 Control unit
10 Drive data network
11 Synchronization clock generator
12 Partial network 1
13 Partial network 2
$S_1 \ldots S_N$ Desired value data
$T_G$ Global synchronization clock
$T_L$ Local synchronization clock
$T_{GH}$ Global synchronization main clock
$T_{GN}$ Global synchronization secondary clock
$D_1 \ldots D_7$ Data sets.

DESCRIPTION OF THE PREFERRED EMBODIMENTS

Referring now to the drawings, wherein like reference numerals designate identical or corresponding parts throughout the several views, FIG. 1 shows a block diagram of a drive system 1 according to the invention. Drive groups are designated by 2. The latter comprise a drive control means 3 and at least one drive 4. The drives 4 for their part comprise at least one motor 5, which is driven by a drive controller 6 and via an intermediately connected power electronic circuit 7. The motors 5 can be, for example, the printing and back-pressure cylinders of a rotary printing machine. The drive controllers 6 of a drive group 2 are connected to one another and to the drive control means 3 via a drive bus 8. The drive control means can also be connected to higher-order control units 9. Within the framework of the invention, the drive control means are connected via a dedicated drive data network 10.

The drive data network forms the backbone of the synchronization and of the data communication of the drive system. It enables precise synchronism of drives which belong to various drive groups, in that it ensures comprehensive synchronization and synchronous desired value data transmission between the drive groups. This is achieved by means of the precise synchronization of the drive groups by means of the transmission of a global synchronization clock via the drive data network. The drive control means of the individual drive groups make their local synchronization clocks of the individual drive groups equal to the global synchronization clock—with high accuracy. The local synchronization clocks on the individual drive buses are thus—with high accuracy—synchronized with the higher-order, global synchronization clock on the drive data network.

In this way, a system-wide synchronization clock for the entire drive system is provided, which is transmitted to all the individual drives in all the drive groups via the local drive buses. Hence, all the individual drives in the overall drive system are precisely synchronized.

In order to operate all the drives in synchronism, the individual drives must also be supplied synchronously (at the same time) with desired value data. This applies in particular in the preferred case of position desired values. Higher requirements on the synchronism of the drives place correspondingly high requirements on the synchronicity of the data transmission of desired values. It is not sufficient that the drives are synchronized to one another via a common clock, the supply of desired value data, that is to say in particular with position desired values, being carried out in a manner uncoordinated with the clock however, since the consistency of the information would no longer be given because of different transmission times or delivery times of the desired value data.

During the transmission of position desired values, exact chronological consistency (simultaneity) of the data supply is indispensable (see also FIGS. 2a, b1, b2).

The validity of position desired values always relates to quite specific points in time. For example: At the time t1, the drive A is intended to be located at position a1 and drive B at position b1. At the next time t2, that is to say at the next clock, drive A is intended to be located at the position a2 and drive B at the position b2.

An Example:

Two drives A and B of a rotary printing machine drive 2 printing cylinders with a different color, which print a paper web at a speed of 10 m/s. In order that a good multicolor print is produced, the 2 differently colored printed images must always be positioned exactly in relation to each other. The two drives A and B are equipped with position controllers which, via a common clock, execute their position control exactly synchronously (that is to say simultaneously, with a maximum synchronization error of 1 µs) with cycle times of 250 µs. From one control cycle to the next, that is to say in 250 µs, the paper has been moved by 2500 µm=2.5 mm. If the drive B were to receive a position desired value b1 erroneously delayed by one control cycle, at the time t2, this would manifest itself in a faulty printed image deviation of 2.5 mm.

The transmission of the position desired value must therefore always be in step with the synchronization clocks.

The desired value data transmission must therefore be incorporated into the time-synchronously operating drive data network. The transmission of desired value data between the drive control means via the drive data network is therefore coordinated with the transmission of the global synchronization clock.

The desired value data transmitted in the drive data network are preferably position desired values of higher-order master shafts. These master shafts do not necessarily exist in physical form, but only in computer terms. These are then referred to as virtual master shafts.

The position values of master shafts form the basis for desired value calculations in the drive control means for the individual drives in the various drive groups. From the position of master shafts, the drive control means derive the desired positions of slave shafts (that is to say of individual drives), whose position is intended to depend on specific master shafts. Any desired drives in various drive groups can thus depend on a predefined master shaft—and be operated in precise synchronism with the master shaft.

FIGS. 3 to 9 show various concepts for the drive data network 10.

The drive data network is intended to provide error-free transmission of the global synchronization clock to the drive control means. Error-free in this case means that the synchronization clock has as small as possible a time jitter, such as is produced by time-discrete signal sampling or variable signal propagation times.

The drive data network is intended to enable synchronous desired value data transmission between the drive control means. Each drive control means must be able to send desired value data to all the other drive control means in the drive system. Synchronous data communication is thus needed, which enables data exchange between any desired participants and allows the transmission of data telegrams to several participants (multicast) or to all participants (broadcast).

Since the drive data network constitutes the backbone of the communication in the drive system, high requirements are placed on its reliability and availability. In particular in large drive systems having a large number of drives, redundant designs of the drive data network are required.

Figure 5:
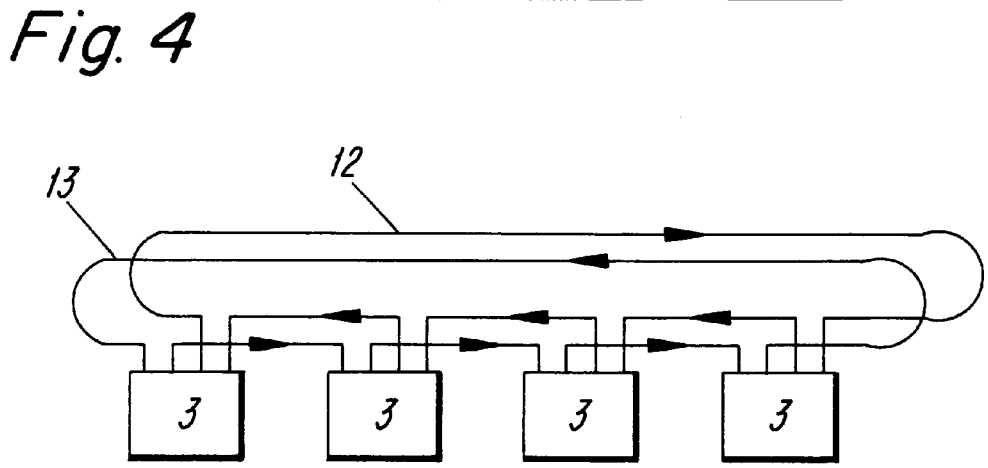
Figure 6:
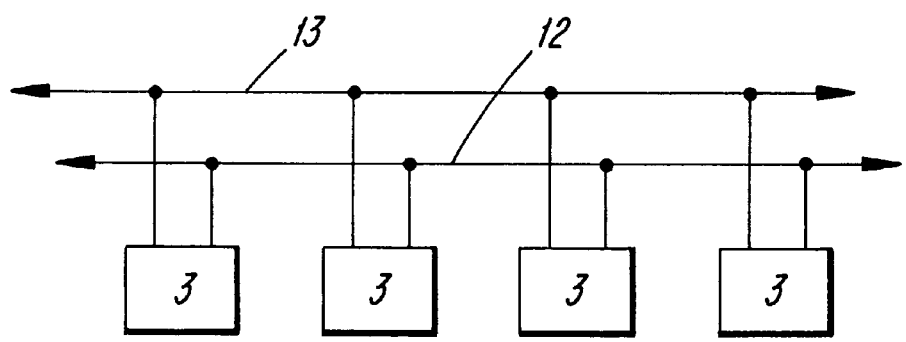
Figure 7:
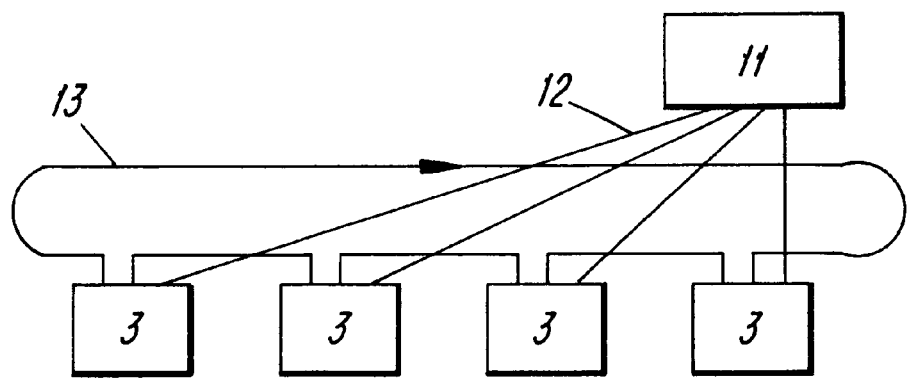

The following concepts may be implemented:
A) Common or separate transmission of clock and data:
  (A1) Transmission of synchronization clock and desired value data via the same lines, (FIGS. 3 and 4)
  (A2) Transmission of synchronization clock and desired value data via separate lines (FIGS. 5 and 6).
B) Optoelectronic or electronic data transmission:
  (B1) Optoelectronic signal transmission, preferably via glass fibers,
  (B2) Electronic signal transmission, preferably via coaxial cables.
C) Topology of the connecting lines:
  (C1) Ring-like connecting lines, preferably for glass fibers, (FIGS. 3, 5, 7, 8, 9)
  (C2) Bus-like connecting lines, preferably for coaxial cables (FIGS. 4, 6),
  (C3) Star-like connecting lines, preferably for glass fibers (FIGS. 7 and 9).
D) Redundancy of the connections:
  (D1) Simple connections, without structural redundancy,
  (D2) Redundant connections.

FIG. 3 shows a drive data network 10 with a ring-like connection of the drive control means 3, via which both the global synchronization clock and the desired value data are transmitted (see also FIG. 2(a)). This solution is particularly suitable for optical signal transmission via glass fibers. A particular advantage of this solution resides in the insensitivity of the glass fiber connection to electromagnetic disturbances.

Figure 4:
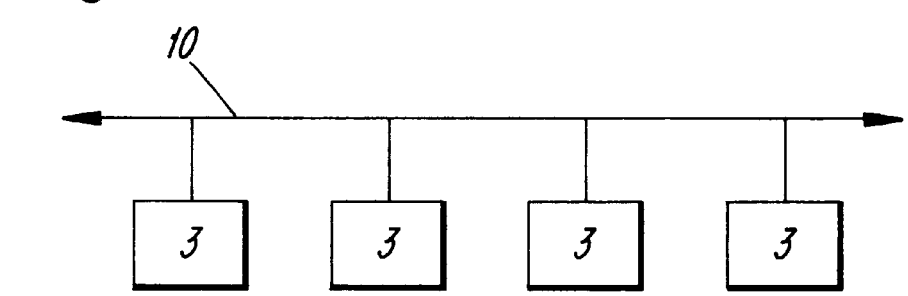

FIG. 4 shows a variant having a simple, bus-like drive data network 10. Here too, desired value data and the synchronization clock are transmitted over the same line. This solution is particularly suitable for electronic signal transmission via coaxial cables. A particular advantage of this solution resides in the high synchronization accuracy as a result of low sampling errors (single signal sampling between transmitter and receiver).

FIG. 5 shows a variant in which the drive data network comprises a first partial network 12 and a second partial network 13. The same data, that is to say desired value data and synchronization clocks, is transmitted via both partial networks. Because of its ring-like structure, this solution is also particularly suitable for optical signal transmission via glass fibers. A particular advantage of this solution resides in the high availability as a result of great insensitivity to electromagnetic disturbances and to damage to the glass fiber cables. The transmission direction on the two redundant partial networks or rings 12 and 13 is preferably opposed.

Each participant (drive control means 3) always transmits its data on both opposed rings and, when receiving, selects one of the two lines. If a participant receives no data on a ring line during a specific, short time interval, then it outputs an error message and switches over to the second ring line in order to receive. On one ring, the data transmission is carried out in the clockwise direction, on the second ring in the counterclockwise direction. Even if both glass fiber rings are cut through between two participants (drive control means), data communication between all the participants is still possible.

FIG. 6 shows a further variant in which two bus-like partial networks 12 and 13 are provided. Once more, both desired value data and synchronization clocks are transmitted via both partial networks. Because of the redundant bus structure, this solution is particularly suitable for electronic signal transmission via coaxial cables. A particular advantage of this solution resides in the high synchronization accuracy as a result of low sampling errors (single signal sampling between transmitter and receiver) and in the high availability, as a result of tolerating the failure of one bus line.

Each participant (drive control means) always transmits its data on both bus lines and, when receiving, selects one of the two bus lines. If a participant receives no data on one bus line during a specific, short time interval, then it outputs an error message and switches over to the second bus line in order to receive. If one bus line is damaged, the data transmission can still be carried out undisturbed via the second bus line.

The dual-guided lines in the form of the partial networks 12 and 13 according to FIGS. 5 and 6 can also be used for the separate transmission of desired value data and of the synchronization clock (see also FIGS. 2(b) and 2(c)). A particular advantage of the separate lines for the transmission of synchronization clock and desired value data resides in the capability of specializing the transmission system for the global synchronization clock (signal shapes, sampling, transmitting and receiving circuits), so that a very small synchronization error is produced.

A further variant is illustrated in FIG. 7. Here, a partial network 13 for the transmission of desired value data is of ring-like design, whereas a star-like connection 12 to a global synchronization clock generator 11 is provided for the transmission of the synchronization clock (see also FIGS. 2(b1) and 2(b2)). A particular advantage of the star-like transmission of the synchronization clock resides in the high synchronization accuracy as a result of low sampling errors (single signal sampling between transmitter and receiver).

Figure 8:
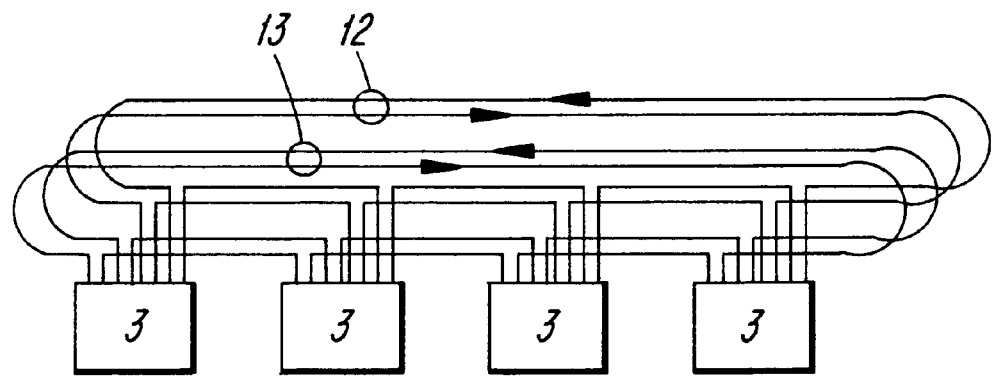
Figure 9:
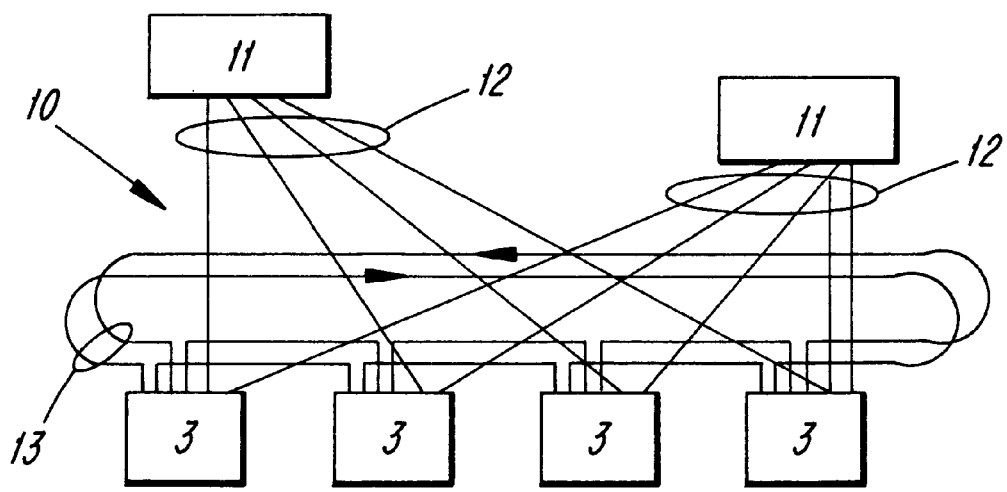

Finally, according to FIG. 8 the partial networks suitable for desired value data and synchronization clocks can also be redundantly designed. This solution combines the advantages of high availability as a result of redundancy with those of good synchronization accuracy as a result of separate transmission of synchronization clock and desired value data.

The latter may also be implemented for a star-like transmission of the synchronization clock. For this purpose, the synchronization clock generators 11 must also be redundantly designed (FIG. 9). This solution combines the advantages of high availability as a result of redundancy with those of good synchronization accuracy as a result of separate transmission of synchronization clock and desired value data.

Each drive control means is preferably equipped with a clock generator for generating the global synchronization clock. By means of specific logic, it is defined which drive control means has priority when transmitting the global synchronization clock. All the lower-order participants on the drive data network then listen to the transmitted synchronization clock and the clock generators there do not transmit any synchronization clock.

The priority control is preferably carried out in such a way that a specific participant always transmits the global synchronization clock in the normal case. In the event that the first-rank participant fails (becomes dumb), another specific participant stands in, being programmed at rank 2 in the priority list. In the event that the second-rank participant fails (becomes dumb), a $3^{rd}$ participant takes over the transmission of the global synchronization clock, and so on.

Another preferred solution is based on running through the priority list regularly, so that each participant in each case transmits the global synchronization clock for a specific, fixed time duration and then hands over to the next participant which, for its part, transmits the synchronization clock for a specific, fixed time duration, and so on. After the last participant of the priority list has transmitted the global synchronization clock for a specific, fixed time, the first-rank participant takes over the transmission of the clock once more, and so on.

In a special case, the clock generators for the global synchronization clock can also be arranged outside the drive control means, in special stations. This is appropriate, particularly in the case of cost-effective solutions which are restricted to one or two clock generators. In this case, the drive control means do not need to be equipped with dedicated clock generators for the global clock.

The global synchronization clock $T_G$ is preferably carried out in accordance with the SERCOS standard (FIG. 2a). The clock period is preferably 62 µs, 125 µs, 250 µs, 500 µs, 1 ms, 2 ms, 3 ms, . . . 63 ms, 64 ms or 65 ms. Cycle times of several ms are—measured on the fast processing times and data transmission times of a digital drive system—a relatively long time interval.

In order to reduce drifting apart in time of the individual drive control means (because of the inaccuracies of the local clock generators/crystals) during the data transmission cycles, it is appropriate to improve the global synchronization in the drive data network by additional secondary clocks at smaller time intervals.

Figure 10:
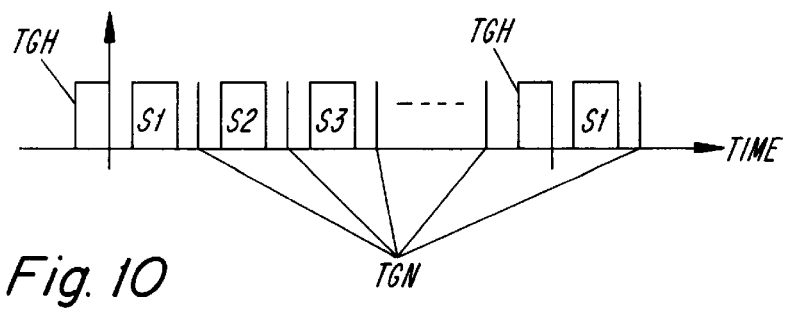
FIG. 10 shows the subdivision of the synchronization clock into a main clock and a plurality of secondary clocks.
Figure 12A:
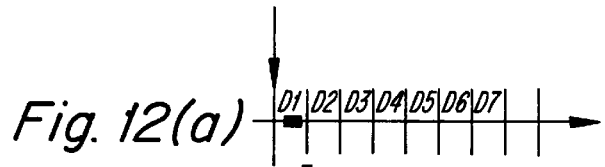
FIGS. 12(a)–12(g), collectively referred to as FIG. 12, shows a diagram with the chronological sequence of the processing of data sets in the case of a two-stage master shaft hierarchy.
Figure 12B:
Figure 12C:
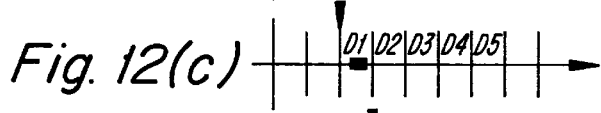
Figure 12D:
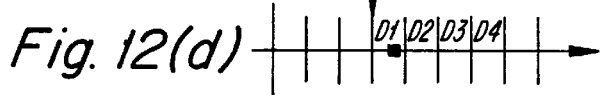
Figure 12E:
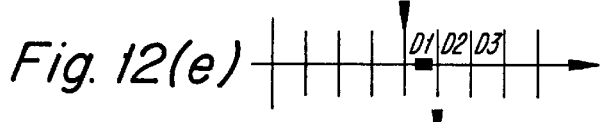
Figure 12F:
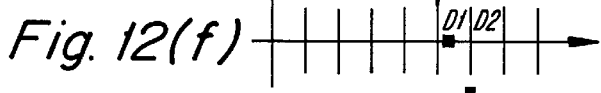
Figure 12G:

The global synchronization clock $T_G$ is therefore preferably implemented by means of a clock hierarchy which is composed of a main clock $T_{GH}$ and subordinate secondary clocks $T_{GN}$ (see FIG. 10).

A two-stage clock hierarchy is composed, for example, of a main clock $T_{GH}$, which is transmitted at a fixed interval of 4 ms, and 15 secondary clocks $T_{GN}$, which are in each case transmitted between two main clocks at a fixed time interval of 250 µs. However, it is also possible to use multistage clock hierarchies (3-stage, 4-stage, . . . ).

The transmission of the desired value data ($S_1 ... S_N$) via the drive data network is preferably carried out under time control and cyclically using fixed transmission time windows for each participant (time division multiple access) (see FIGS. 2 and 10).

The time control is given by the global synchronization clock $T_G$. The data transmission cycle, in which all the drive control means in the drive data network are given an opportunity to transmit, depends on the cycle time, for example of the SERCOS standard, and is preferably of the order of magnitude of 1 ms. Each drive control means (of each participant) has one or more time windows in each transmission cycle, in which window it can transmit its telegrams and the desired value data contained therein.

The time-controlled data transmission is commensurate with the requirement that a continuous data stream of desired value data is to be transmitted, which must always be in step with the global synchronization clock. The time-controlled, cyclic data transmission using time division multiple access is accordingly preferably combined with the use of a clock hierarchy for the global synchronization clock, comprising the main clock $T_{GH}$ and secondary clocks $T_{GN}$.

The desired value data transmissions via the drive data network, the desired value calculations in the drive control means, the desired value data transmissions in the drive buses and the controls in the drives are preferably carried out synchronously and cyclically (using pipelining).

The entire drive system operates cyclically and synchronously. This applies to the higher-order data transmission via the drive data network, the desired value calculations in the drive control means of the individual drive groups, the data transmissions in the drive buses of the individual drive groups and the control processes in the drive controllers of the individual drives. The steps in the desired value calculation and desired value transmission are executed using pipelining—and in so doing synchronized via the global clock (see FIGS. 11 and 12).

Each individual functional unit executes its function cyclically. The data transmissions in the drive data network, the desired value calculations in the individual drive control means, the data transmissions in the individual drive buses and the position controls in the individual drives are in each case carried out cyclically and—via the system-wide synchronization clock—synchronized with one another (in step).

The steps of the desired value calculation and desired value data transmission for a one-stage master shaft hierarchy are specified below (FIG. 11):

(a) Calculation of master shaft desired values in the drive control means
(b) Data transmission of the master shaft desired values via the drive data network
(c) Calculation of slave shaft desired values in the drive control means
(d) Data transmission of slave shaft desired values via the drive buses
(e) Execution of position control in the individual drives Steps (d) and (e) in this case correspond to the known procedure in drive systems having a drive bus in accordance with the SERCOS—standard mentioned at the beginning.

In the case of a two-stage master shaft hierarchy, the sequence is expanded accordingly. The steps of the desired value calculation and data transmission for a two-stage master shaft hierarchy are specified below (FIG. 12):

(a) Calculation of main master shaft desired values in the drive control means
(b) Data transmission of the main master shaft desired values via the drive data network
(c) Calculation of master shaft desired values in the drive control means
(d) Data transmission of master shaft desired values via the drive data network
(e) Calculation of slave shaft desired values in the drive control means
(f) Data transmission from slave shaft desired values via the drive buses
(g) Execution of position controls in the individual drives Steps (f) and (g) once more correspond to the known procedure in drive systems having a drive bus in accordance with the SERCOS standard.

In the preferred case, the cycle times of the data transmission in the drive data network, the desired value calculation in the drive control means and the data transmission in the drive buses are identical.

The cycle times for the individual processing and data transmission steps in the drive control means and in the drive data network are preferably matched to the cycle times of the SERCOS standard—and are therefore preferably of the order of magnitude of 1 ms (about 100 μs to about 10 ms).

It is known that the cycle times of the drive controllers are preferably shorter than the cycle times of the data transmission on the drive bus. As a result of the shorter cycle times, the drive controllers have better control dynamics and better dynamic control accuracy. The processing cycles in the individual drive controllers typically lie in the range of 250 μs.

Therefore, the drive controllers—as is known—carry out an interpolation of the desired values predefined by the drive control means, with the result that there are intermediate values for the control. For example, given a cycle time of the desired value transmission of 1 ms and a cycle time for the position control in the drive controller of 250 μs, in each case 3 intermediate values of the position desired value are determined in the drive controller by means of interpolation.

During the execution of the function in the drive system, the individual functional units—drive control means, drive data network, drive buses and drive controllers—in each case operate successively on the data of a specific data set. The data of one data set is thus shifted step by step through the pipeline in accordance with the predefined synchronization clock.

Figure 11A:
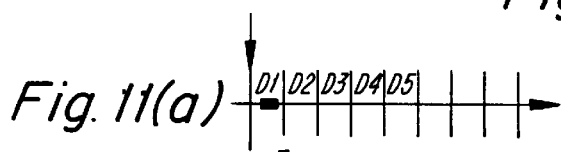
FIGS. 11(a)–11(e), collectively referred to as FIG. 11, shows a diagram with the chronological sequence of the processing of data sets in the case of a one-stage master shaft hierarchy.
Figure 11B:
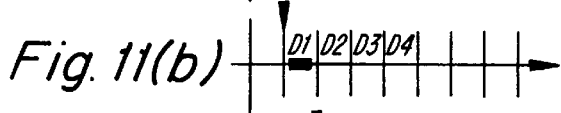
Figure 11C:
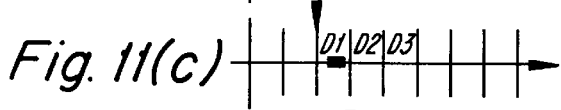
Figure 11D:
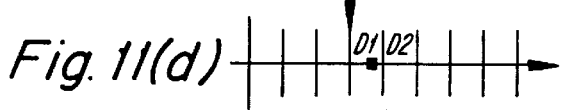
Figure 11E:

An example having a one-stage master shaft hierarchy (FIG. 11):

In the clock cycle 1 (FIG. 11(a)), the drive control means A calculates the master shaft desired values for the data set D1. In the clock cycle 2 (FIG. 11(b)), the master shaft desired values of the data set D1 are transmitted via the drive data network. In the clock cycle 3 (FIG. 11(c)), the drive control means A, B, C calculate the corresponding slave shaft desired values for the data set D1 from the master shaft desired values supplied. In the clock cycle 4 (FIG. 11(d)), the slave shaft desired values of the data set D1 are transmitted via the drive buses.

The time to run through the pipeline—until the delivery of the desired values to the drive controllers—is, for example in the case of a one-stage master shaft hierarchy, 4 cycle times (FIG. 11) and in the case of the two-stage master shaft hierarchy 6 cycle times (FIG. 12).

From clock cycle to clock cycle, a functional unit processes successive data sets. For example (FIG. 11), the drive data network transmits in cycle 2 the master shaft desired values of the data set D1 and, in the following cycle 3, the master shaft desired values of the data set D2.

At one point in time, that is to say in one cycle, the various functional units of the pipeline are operating on different data sets.

For example (FIG. 11): In clock cycle 4 (FIG. 11(d)), the drive control means A calculates the master shaft desired values of the data set D4, the drive data network transmits the master shaft desired values of the data set D3, the drive control means A, B and C calculate the slave shaft desired values of the data set D2 and the slave shaft desired values of the data set D1 are transmitted via the drive buses.

From the example it becomes clear that drive control means can execute tasks from various stages of the pipeline in one cycle, namely the calculation of master shaft desired values and of slave shaft desired values.

For example (FIG. 11): The drive control means A calculates in cycle 4 (FIG. 11(d)) the master shaft desired values of the data set D4 and the slave shaft desired values of the data set D2.

Under certain circumstances, it may be appropriate to simplify and to shorten the specified step sequence of desired value calculation and desired value data transmission in the pipelining by means of combining a plurality of steps to form one processing step in each case.

Thus, it may be advantageous in each case to fuse the desired value calculation and desired value transmission (of one hierarchical plane) to form one processing step in the pipeline. For example, in the case of a two-stage master shaft hierarchy (FIG. 12), the steps (a) and (b) can thus be combined to form a step I, the steps (c) and (d) to form a step II, and the steps (e) and (f) to form a step III.

In this way, individual processing steps in the pipeline become more comprehensive, but the number of processing steps in the pipeline is reduced.

During the calculation of the master shaft positions and of the slave shaft positions in the drive control means, and during the data transmission via the drive data network and via the drive buses, the time consistency (simultaneity) of the desired value data for the individual drives is ensured (see FIG. 11).

It is decisive for the correct functioning of the drive system that all the drives whose position depends on a common master shaft (or main master shaft) receive their desired value data synchronously (simultaneously, in step, in the same cycle).

The time consistency of the supply of desired value data to the synchronously operated drives must always be maintained. Time consistency means that all the synchronously operated drives receive the data of a specific data set simultaneously, that is to say in the same cycle.

In the example of FIG. 11, the individual drive controllers receive the slave shaft desired values of the data set D1 in cycle 5, the slave shaft desired values of the data set D2 in cycle 6, and so on.

It follows from the requirement for strict time consistency that the fixed rhythm of the pipelining always has to be observed in a consistent manner.

Time consistency of the supply of desired value data means, for example, that the desired value data for an individual drive, which depends directly on the (virtual) master shaft, is to be supplied to the drive simultaneously, that is to say in the same cycle, with the desired value data for all the other drives (slave shafts) which depend on the same master shaft.

Although in the case of the drive which depends directly on the (virtual) master shaft a calculation of slave shaft desired values is not necessary, it is not appropriate to supply the desired value data to this drive earlier (immediately), since this would lead to a time inconsistency.

In the case of a one-stage master shaft hierarchy, the desired value data of the data set D1 for a drive which depends directly on the (virtual) master shaft, is thus to be supplied via the drive bus only in cycle 4, in step with the desired value data of the other drives (slave shafts) which depend on the same master shaft. Earlier delivery of the desired value data of the data set D1 to the drive which depends directly on the (virtual) master shaft, for example in cycle 2, would be erroneous.

The same is true in the case of a multistage master shaft hierarchy for individual drives which depend directly on a (virtual) main master shaft (FIG. 12). Although a calculation of master shaft desired values and slave shaft desired values is not necessary for a drive which depends directly on the main master shaft, earlier delivery of the desired value data via the drive bus to this drive is not appropriate.

In the case of a two-stage master shaft hierarchy (FIG. 12), the desired values of the data set D1 for a drive which depends directly on the (virtual) main master shaft, are to be delivered to the drive via the drive bus in step with the desired values for all the other drives (slave shafts) which depend on the same main master shaft, that is to say in cycle 6.

The requirement for time consistency of the supply of the desired value data to the individual drives also always has to be observed in relation to the desired value data transmissions. For example (FIG. 11), the drive control means A, B and C calculate the slave shaft desired values of the data set D1 in cycle 3. The slave shaft desired values D1 are calculated from the master shaft desired values D1.

Since the master shaft desired values are calculated in the drive control means A, the drive control means A could already calculate the slave shaft desired values D1 in cycle 2. Data transmission of the master shaft desired values from A to A via the drive data network is certainly not necessary.

The earlier calculation of the slave shaft desired values belonging to data set D1 in the drive control means A would, however, lead to a time inconsistency with the calculation of the slave shaft desired values of the data set D1 in the drive control means B and C, which can only be carried out in cycle 3.

For reasons of time consistency of the data, it is therefore appropriate to carry out the calculation of the slave shaft desired values in the drive control means A in step, that is to say in precisely the same cycle as in the drive control means B and C—although the master shaft desired values are already available one cycle earlier in the drive control means A, since a data transmission via the drive data network (from A to A) is not necessary.

The drive control means preferably calculate the position desired values for (virtual) main master shafts and (virtual) master shafts, and calculate the position of slave shafts from master shaft positions.

The calculation of the position desired values for the master shaft is preferably carried out by integrated speed desired values, which are supplied by the higher-order control of the functional unit (master shaft position=integral of master shaft speed).

In this way, the position of a virtual (not existing physically in reality) master shaft is calculated. A virtual master shaft of this type has the advantage that mechanical inaccuracies and measurement errors of the position transmitter, as well as noise problems of the signal, are avoided.

The advantage of calculating the master shaft position by means of the drive control means resides in the fact that the predefinitions, typically the desired master shaft speed, are provided by the higher-order control of the functional unit.

The position of the master shaft can (in special cases) also be supplied by a position transmitter which is fitted to a mechanical shaft and transmits the position of this shaft.

An example of a mechanical master shaft in printing technology is indicated in the document DE 42 14 394 A1 cited at the beginning. In that document, the position of the individually driven printing cylinders (slave shafts) depends directly on the position of the shaft of the folding apparatus (master shaft).

The derivation of the position of the slave shaft from the position of a (virtual) master shaft preferably comprises taking into account position correction values or speed correction values.

The calculation of the slave shaft desired value for an individual drive comprises, in the simplest case, the addition of the master shaft desired value and of a position correction value which is specific for the individual drive (slave shaft position=master shaft position+position correction).

The desired position correction for the individual drive is in this case transmitted by the higher-order control to the drive control means. The position of the slave shaft will then deviate from the position of the (virtual) master shaft by the predefined position correction.

The position correction value can also be formed by integrating a speed value (speed correction). In this case, the speed of the slave shaft will deviate from the speed of the (virtual) master shaft by the predefined speed correction (slave shaft speed=master shaft speed+speed correction).

The speed correction is preferably selected such that the speed correction for the slave shaft is proportional to the speed of the master shaft. The speed correction value for the slave shaft is in this case calculated by multiplying the master shaft speed by a transmission ratio (gear transmission factor) (speed correction=master shaft speed*gear transmission factor).

A gear transmission factor is a rational number which is formed by dividing two integer numbers (tooth ratio of two gear wheels), and describes the transmission ratio of a gear transmission. In this way, the function of a mechanical gear transmission (differential gear transmission) is simulated.

There may be hierarchies of master shafts, with the result that the position of one or more (virtual) master shafts depends on a (virtual) main master shaft. At one point in time it is possible for a plurality of (virtual) master shafts and a plurality of (virtual) main master shafts to exist simultaneously.

In the event that, in one drive system, there is a plurality of (virtual) master shafts at one point in time, one master shaft supplies the position reference for a number of individual drives, which may belong to various drive groups.

In one drive system, there may be a hierarchy of (virtual) master shafts. For example, there may be (virtual) main master shafts and (virtual) master shafts, so that the position of a plurality of master shafts is derived from the position of a main master shaft. At one point in time there may be a plurality of main master shafts. Each main master shaft in this case supplies the position reference for a number of master shafts.

It is also possible to use multistage master shaft hierarchies (3-stage, 4-stage, . . . ).

The predefinition of master shafts (and main master shafts) and the making of individual drives dependent on master shafts can be carried out dynamically—according to the changing requirements of flexible production in industrial production plants.

It is possible for production groups to be formed in a flexible way, said groups comprising a plurality of drives made up of one or more drive groups, which can be operated in precise synchronism and in so doing depend on the position of a (virtual) master shaft.

There may be hierarchies of production groups, with the result that a plurality of production groups belong to one production main group, and the position of the (virtual) master shafts depends on the position of a (virtual) main master shaft.

There may be a plurality of production groups and a plurality of production main groups simultaneously in the drive system at one point in time.

A number of individual drives can be connected together for the duration of a production run, to form a production group, in that the individual drives depend on a predefined (virtual) master shaft for the duration of the production run. After the production run has been completed, the individual drives can be incorporated into new and otherwise configured production groups.

It is possible for there to be a plurality of production groups in the drive system at one point in time. Each production group comprises a number of drives, whose position depends on a specific (virtual) master shaft.

A plurality of production groups can be connected together for the duration of a production run to form a production main group, in that the master shafts of the production groups depend on a predefined (virtual) main master shaft for the duration of the production run. After the production run has expired, the main shafts and the individual drives can be incorporated into new and differently configured production main groups and production groups.

It is possible for there to be a plurality of production main groups in the drive system at one point in time. Each production main group contains a number of (virtual) master shafts, whose position depends on a specific (virtual) main master shaft.

It is also possible to use multistage hierarchies of production groups (3-stage, 4-stage, . . . ).

The formation of production groups and production main groups is variable and is carried out in each case for a specific time duration, for example for the duration of a specific production run.

An Example:

In newspaper printing presses, a specific production quantity (edition) of identical newspaper products (newspaper issue) is produced in one production run. Newspaper issues have a specific scope (number of pages) and a specific color of the individual pages. Different newspaper issues can have different scopes and different colors of the individual pages.

Newspapers are produced by printing a plurality of paper webs. The number of paper webs depends on the scope (number of pages) of the respective newspaper issue.

Each paper web is printed by a plurality of printing cylinders. The number of printing cylinders, the printing cylinders used and their sequence depend on the color of the newspaper pages which are located on the front side and on the back side of the respective paper web.

After printing, the paper webs are led together and then folded and cut in a folding apparatus to form finished newspapers.

In the present example, each individual printing cylinder is moved by a dedicated drive. A printing unit contains 6 printing cylinders with a dedicated drive in each case. The drives of one printing unit form a drive group (with common drive bus and common drive control means). The folding apparatus contains 2 folding cylinders. The drives of the folding apparatus form a dedicated drive group (with common drive bus and common drive control means).

In a production run P1, a production quantity of 100,000 copies of the newspaper issue Z1 is produced. The newspaper issue Z1 is produced by printing 2 paper webs. Paper web B1 is printed by 8 printing cylinders, in each case 4 printing cylinders having different colors on each side of the paper (4/4). Paper web B2 is printed by 4 printing cylinders, 2 on the front side of the web, 2 on the back side (2/2). Following printing, the paper webs are led one above another so that they coincide and are folded and cut in a folding apparatus. The folding apparatus contains 2 folding cylinders.

For the duration of the production run P1, all 14 of the drives involved in the production belong to one production main group. The production main group contains 2 production groups. The 8 drives acting on the web B1 form one production group. The 4 drives acting on the web B2 form a second production group. The 2 drives of the folding apparatus belong directly to the production main group.

The position of the (virtual) main master shaft is calculated from the desired production speed by means of integration. The position of the (virtual) main shafts for the individual webs is derived from the position of the main master shaft. The position of the slave shafts, that is to say of the drives of the individual printing cylinders acting on the web, is derived from the position of the master shaft for one web.

During the production run, in order to shift the position of one paper web (in the transport direction) in relation to the other paper web, in order that the paper webs lie one above another so that they coincide, only the position correction value for the master shaft of the appropriate production group has to be changed.

During the production run, in order to vary the position of the printed image of a printing cylinder (in the transport direction) in relation to other printing cylinders which are acting on the same web, the position correction value of the appropriate drive (slave shaft) is appropriately changed.

At the same time as the production run P1, it is possible in the newspaper printing press for another newspaper issue Z2 with a different scope and a different color and different edition level to be printed in a production run P2—using the printing cylinders not needed by P1. After the production run P1 has been completed, another newspaper issue Z3 is printed in a further production run P3.

It is also possible for setting-up operations in the production plant, for example for threading a paper web through printing units, for appropriate production groups to be formed temporarily in the drive system. The formation of production groups is dynamic in the sense that, during operation, the assignment of slave shafts to master shafts can be altered.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a drive system, the drive system having plural drive groups connected by a drive data network, each of the drive groups including a drive control means connected to at least one drive controller via a drive bus, the method comprising steps of:

generating local synchronization clocks to synchronize drive controllers in the respective drive groups;

making the local synchronization clocks equal to a global synchronization clock using the drive data network;

transmitting desired value data intended for the drive groups via the drive data network, based on the global synchronization clock, between the drive control means of the drive groups, wherein the desired value data contains desired values of shafts associated with the drive system; and calculating and transmitting the desired value data for the shafts at consistent times via the drive data network.

2. A method as claimed in claim 1, wherein the desired value data transmitted via the drive data network contains position information about master shafts.

3. A method as claimed in claim 1, wherein the step of calculating comprises calculating the desired values of the drive groups in the drive control means on the basis of a position value of one or more master shafts.

4. A method as claimed in claim 3, wherein the step of calculating comprises calculating the desired values of the master shafts by integrating predefined desired speed values associated with the shafts.

5. A method as claimed in claim 1, wherein a plurality of drive control means are equipped to provide the global synchronization clock, the method further including the step of determining, using a priority list, which drive control means is authorized to provide the global synchronization clock.

6. A method as claimed in claim 5, further comprising the step of running through the priority list in cyclic fashion so that the global synchronization clock is successively generated for a specific time period by various drive control means.

7. A method as claimed in claim 1, wherein a synchronization clock generator for generating the global synchronization clock is incorporated into the drive data network.

8. A method as claimed in claim 1, further comprising the step of subdividing the global synchronization clock into a main clock and at least one secondary clock.

9. A method as claimed in claim 1, wherein the step of transmitting the desired values for the shafts at consistent times comprises transmitting the desired value data in fixed time windows.

10. A method as claimed in claim 1, wherein said step of calculating and transmitting comprises the steps of:

synchronously and cyclically transmitting the desired value data via the drive data network and the drive bus;

synchronously and cyclically calculating the desired value data in the drive control means; and synchronously and cyclically controlling the drives.

11. A method as claimed in claim 1, further comprising the steps of:

forming hierarchies of main master shafts and master shafts; and the step of calculating comprises calculating the desired value data of one or more master shafts from the desired value data of one or more main master shafts.

12. A method as claimed in claim 1, further comprising the step of forming a plurality of master shafts or main master shafts, or both master shafts and main master shafts.

13. A method as claimed in claim 1, further comprising the step of forming flexible production groups by variably assigning drives to master shafts.

14. A method as claimed in claim 1, further comprising the step of controlling a number of printing cylinders using the method.

15. A drive system, comprising:

at least two drive groups, each drive group having at least one drive having at least one motor and a drive controller, wherein drive controllers of a drive group are connected to one another via a drive bus;

wherein each drive group further includes a drive control means for generating a local synchronization clock, wherein the drive control means of the drive groups are connected to one another via a dedicated drive network;

wherein said drive system includes means for transmitting a global synchronization clock and desired value data of shafts over the dedicated drive network, and said drive system includes means for synchronizing its operation based on said global synchronization clock and said desired value data.

16. A drive system as claimed in claim 15, wherein the desired value data transmitted via the drive data network contains position information about master shafts.

17. A drive system as claimed in claim 15, wherein the drive control means contains means for calculating the desired values of the drive groups on the basis of a position value of one or more virtual master shafts.

18. A drive system as claimed in claim 15, wherein a plurality of drive control means are equipped with means to form the global synchronization clock, and wherein specific logic means sets a priority list which determines which drive control means is authorized to provide the global synchronization clock.

19. A drive system as claimed in claim 18, wherein the priority list cyclically and successively assigns various drive control means the role of generating the global synchronization clock for a specific time period.

20. A drive system as claimed in claim 15, wherein a global synchronization clock generator is incorporated into the drive data network for generating the global synchronization clock.

21. A drive system as claimed in claim 20, wherein a plurality of drive control means or the global synchronization clock generator includes means for subdividing the global synchronization into a main clock and at least one secondary clock.

22. A drive system as claimed in claim 15, wherein the drive system is configured to transmit the desired value data via the drive data network in fixed time windows.

23. A drive system as claimed in claim 15, wherein the drive control means includes means for calculating the position values of master shafts by integrating predefined speed desired values.

24. A drive system as claimed in claim 15, wherein:

the drive data network and the drive bus are configured to synchronously and cyclically transmit the desired value data;

the drive control means is configured to synchronously and cyclically calculate the desired value data; and the drive control means is configured to synchronously and cyclically control the drives.

25. A drive system as claimed in claim 15, wherein the drive control means includes means for forming hierarchies of main master shafts and master shafts, such that the desired value data of one or more master shafts is calculated from the desired value data of one or more main master shafts.

26. A drive system as claimed in claim 15, wherein the drive control means is configured to form a plurality of master shafts or main master shafts, or both master shafts and main master shafts.

27. A drive system as claimed in claim 15, wherein said drive control means is configured to form flexible production groups by means of a variable assignment of drives to master shafts.

28. A drive system as claimed in claim 15, further including a plurality of printing cylinders which are driven by said drive system.

29. A drive system as claimed in claim 15, wherein at least one drive control means comprises a synchronization clock generator for forming the global synchronization clock, and the drive data network has a ring-like structure.

30. A drive system as claimed in claim 15, wherein the drive data network comprises a first and second partial network, the global synchronization clock being transmitted via the first partial network and the desired value data being transmitted via the second partial network.

31. A drive system as claimed in claim 15, wherein the drive data network comprises a first and second partial network, a global synchronization clock generator which is incorporated into the first partial network, wherein generator data lines lead in star fashion to the drive control means of the drive groups, and the second partial network connects all the drive control means and has a ring-like configuration.

32. A drive system as claimed in claim 15, wherein the drive data network has redundant network elements.

\* \* \* \* \*